(12) United States Patent
Karasaki et al.

(10) Patent No.: US 10,843,294 B2
(45) Date of Patent: Nov. 24, 2020

(54) LASER PROCESSING APPARATUS

(71) Applicant: Panasonic Intellectual Property Management Co., Ltd., Osaka (JP)

(72) Inventors: Hidehiko Karasaki, Hyogo (JP); Hidefumi Saeki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 268 days.

(21) Appl. No.: 15/962,056

(22) Filed: Apr. 25, 2018

(65) Prior Publication Data
US 2018/0326537 A1 Nov. 15, 2018

(30) Foreign Application Priority Data
May 12, 2017 (JP) .................................. 2017-095281

(51) Int. Cl.
| | | |
|---|---|---|
| *B23K 26/14* | (2014.01) | |
| *B23K 26/142* | (2014.01) | |
| *B23K 26/364* | (2014.01) | |
| *B23K 103/00* | (2006.01) | |

(52) U.S. Cl.
CPC .......... *B23K 26/142* (2015.10); *B23K 26/364* (2015.10); *B23K 2103/56* (2018.08)

(58) Field of Classification Search
CPC ...... B23K 26/142; B23K 26/16; B23K 9/324; B23K 9/325; B23K 15/06; B23K 26/0042; B23K 26/359; B23K 26/364
See application file for complete search history.

(56) References Cited

U.S. PATENT DOCUMENTS

| | | | | |
|---|---|---|---|---|
| 3,866,398 A | * | 2/1975 | Vernon, Jr. ........ | B23K 26/1438 134/1.3 |
| 4,315,133 A | * | 2/1982 | Morgan ............. | B23K 26/1488 219/121.84 |
| 4,839,489 A | * | 6/1989 | Dyer ...................... | B23K 9/325 219/72 |
| 5,662,762 A | * | 9/1997 | Ranalli ................. | B08B 7/0042 156/707 |
| 2009/0068598 A1 | * | 3/2009 | Murase .................. | B23K 26/40 430/311 |

(Continued)

FOREIGN PATENT DOCUMENTS

JP 2014-200842 A 10/2014

*Primary Examiner* — Brian W Jennison
(74) *Attorney, Agent, or Firm* — Pearne & Gordon LLP (57) ABSTRACT

Provided is a laser processing apparatus comprises a stage holding a substrate, the stage being movable in a first direction, a laser beam source radiating a laser beam onto the substrate, a dust-suction duct having a first optical path extending in a second direction perpendicular to the first direction, the laser beam travelling along the first optical path thereof, and an air aspirator aspirating an air toward a direction opposite to the first direction, wherein the dust-suction duct includes a pair of air-guiding plates opposed to each other along a third direction perpendicular to the first and second directions, and wherein the pair of the air-guiding plates are configured to have a gap therebetween such that it is narrowest in an optical path region and gets wider as it is far away from the optical path region in upstream and downstream regions thereof.

8 Claims, 7 Drawing Sheets

(56) References Cited

U.S. PATENT DOCUMENTS

| | | | |
|---|---|---|---|
| 2014/0026351 A1* | 1/2014 | Willey | B08B 15/04 15/300.1 |
| 2014/0305917 A1* | 10/2014 | Gadd | B23K 26/142 219/121.72 |
| 2014/0305918 A1* | 10/2014 | Endo | B23K 26/40 219/121.84 |
| 2017/0043432 A1* | 2/2017 | Yoshii | B23K 26/361 |

* cited by examiner

LASER PROCESSING APPARATUS

CROSS REFERENCE TO RELATED APPLICATION

The present application is based on and claims priority under 35 U.S.C. § 119 with respect to the Japanese Patent Application No. 2017-095281, filed on May 12, 2017, of which entire content is incorporated herein by reference into the present application.

TECHNICAL FIELD

The present invention relates to a laser processing apparatus, and in particular to the laser processing apparatus for forming a plurality of groove-like apertures (which may be referred to as streets herein) in dicing regions by radiating a pulsed laser beam, to define functional device regions on a processed substrate.

BACKGROUND

Upon radiating the pulsed laser on the processed substrate or the substrate to be processed such as a silicon substrate and a sapphire substrate along the streets thereof, a portion of a constituent of the processed substrate such as silicon and sapphire is fused and the fused debris splatters and recoils. When the melted debris receives the laser beam having a high energy density, electrons dissociates from silicon atoms, for example, and a small plasma atmosphere is formed, in which cations and electrons are randomly activated. Such a small plasma atmosphere may be called as a laser-excited plasma cloud, and as the laser beam has a shorter wavelength, the recoiling melted debris has a greater initial velocity and more likely pulverizes so that more debris each having a smaller mass tend to splatter further far away from the targeted points (streets) of the laser beam radiation.

Those debris may adhere or deposit on electrical circuits or electrical connections (bumps) formed in the functional device regions adjacent to the streets, thereby deteriorating functions of the electrical circuits.

The laser processing apparatus is configured to radiate the pulsed laser on the processed substrate which is moved or translated in the directions of the streets. Although the laser-excited plasma cloud is shifted in accordance with the translation of the processed substrate, the configuration thereof is substantially maintained during the short time period corresponding to the duty cycle of the pulsed laser. Also, unlike the granular solid debris, the laser-excited plasma cloud has a unique refractive index so that the laser beam passing through the laser-excited plasma cloud may not focus on the targeted points or streets, causing the processed lines meandering.

Figure 7A:
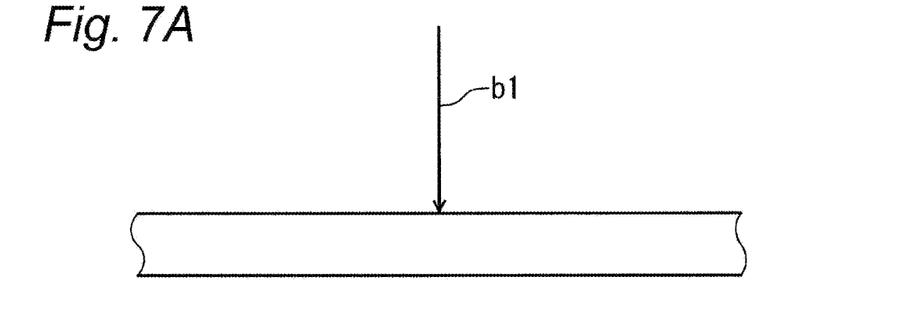
FIGS. 7A-7D are conceptual enlarged views of the configuration of the laser-excited plasma cloud formed by radiating the laser beam onto the substrate, when using the laser processing apparatus according to the prior art technique.
Figure 7B:
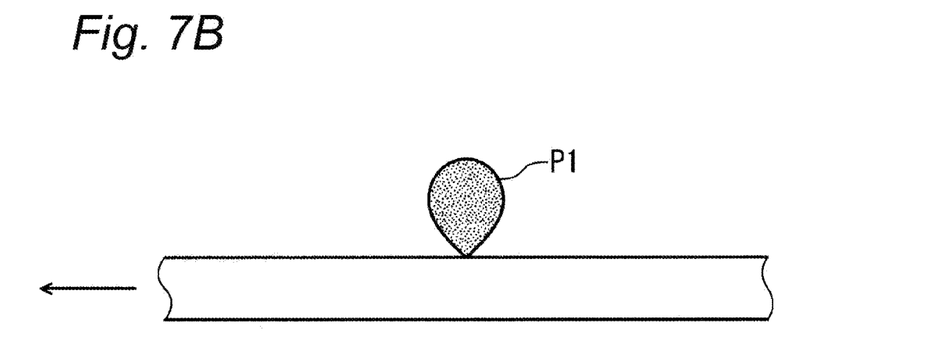
Figure 7C:
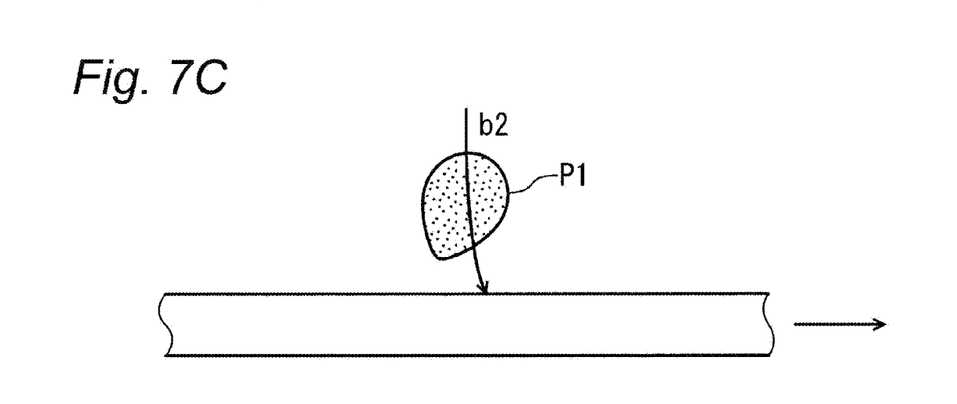

FIGS. 7A-7D are conceptual enlarged views illustrating the laser-excited plasma cloud P1 formed by the pulsed laser beam b1 while the pulsed laser beam is radiated on the processed substrate W that is being translated. FIG. 7A depicts the first pulsed laser beam b1 that is irradiated onto the substrate W, which melts the silicon or sapphire composing the substrate W and forms the laser-excited plasma cloud P1 as depicted in FIG. 7B. While the substrate W is translated in a left direction in FIG. 7B, the second pulsed laser beam b2 is radiated onto the substrate W, which leaves the laser-excited plasma cloud P1 formed by the first pulsed laser beam b1 on the optical path of the second pulsed laser beam b2. In this situation, the second pulsed laser beam b2 is radiated and refracted through the laser-excited plasma cloud P1 which has a unique refractive index different from that of air, causing the processed lines of the laser beam meandering.

Figure 7D:
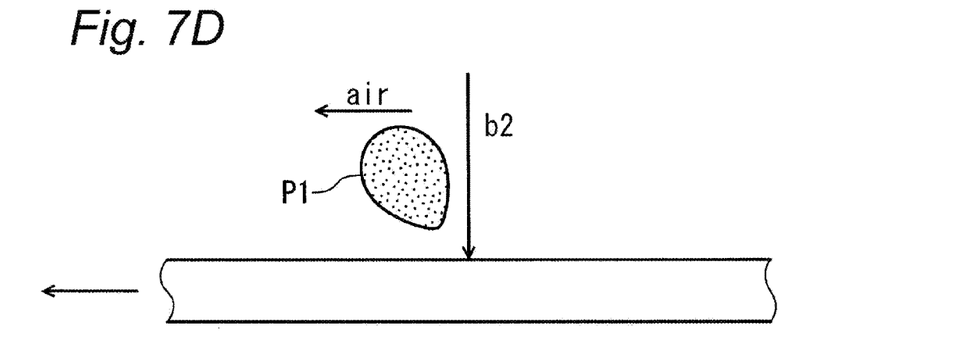

Meanwhile, Patent Document 1 (JP 2014-200842 A) discloses a laser processing apparatus which removes dusts such as debris formed by radiating the laser beam onto the processed material without interfering the optical path of the laser beam. The laser processing apparatus of Patent Document 1 also radiate the pulsed laser beam on the processed substrate which is translated, it includes an air blower configured as means for removing dusts, which blows the air in the direction same as the translation direction of the processed substrate (see FIG. 6 of Patent Document 1). This allows the dusts such as debris formed by radiating the laser beam is shifted away from the optical path of the laser beam as illustrated in FIG. 7D.

However, a typical laser processing apparatus reciprocates the substrate back and forth to radiate the laser beam on the point from the front end to the rear end along one street and then from the rear end to the front end along another adjacent street, thereby to improve the production yield. The air blower of the laser processing apparatus of Patent Document 1 is structured to blow the air to the same direction. Therefore, when the substrate W is translated in the direction opposite to one depicted in FIG. 7D, the laser-excited plasma cloud P1 formed by the first pulsed laser beam b1 substantially remains on the optical path of the subsequent second pulsed laser beam b2, which irregularly refracts the second pulsed laser beam b2, causing the processed lines of the laser beam meandering.

SUMMARY

One aspect of the present invention relates to a laser processing apparatus, which comprises a stage holding a substrate, the stage being movable at least in a first direction, a laser beam source radiating a laser beam onto the substrate held on the stage to process the substrate, a dust-suction duct provided between the laser beam source and the stage, the dust-suction duct having a first optical path extending from a first opening to a second opening thereof in a second direction perpendicular to the first direction, the laser beam travelling along the first optical path thereof, and an air aspirator provided downstream the dust-suction duct, the air aspirator aspirating an air within the dust-suction duct toward a direction opposite to the first direction. The dust-suction duct includes a pair of air-guiding plates opposed to each other along a third direction perpendicular to the first and second directions, and the pair of the air-guiding plates are configured to have a gap therebetween such that it is narrowest in an optical path region containing the first optical path and gets wider as it is far away from the optical path region in upstream and downstream regions thereof.

DETAILED DESCRIPTION

With reference to attached drawings, a laser processing apparatus 1 according to an embodiment of the present invention will be described hereinafter. In the description, a couple of terms for indicating the directions (for example, "upper", "lower", "right", "left", "upstream", "downstream" or "X-, Y-, Z-direction") are conveniently used just for facilitating clear understandings, it should not be interpreted that those terms limit the scope of the present invention. Also, in the drawings, each component of the laser processing apparatus 1 is illustrated in a relative manner in size for clarifying the shape and the feature thereof, and not necessary in the exact scale.

Figure 1:
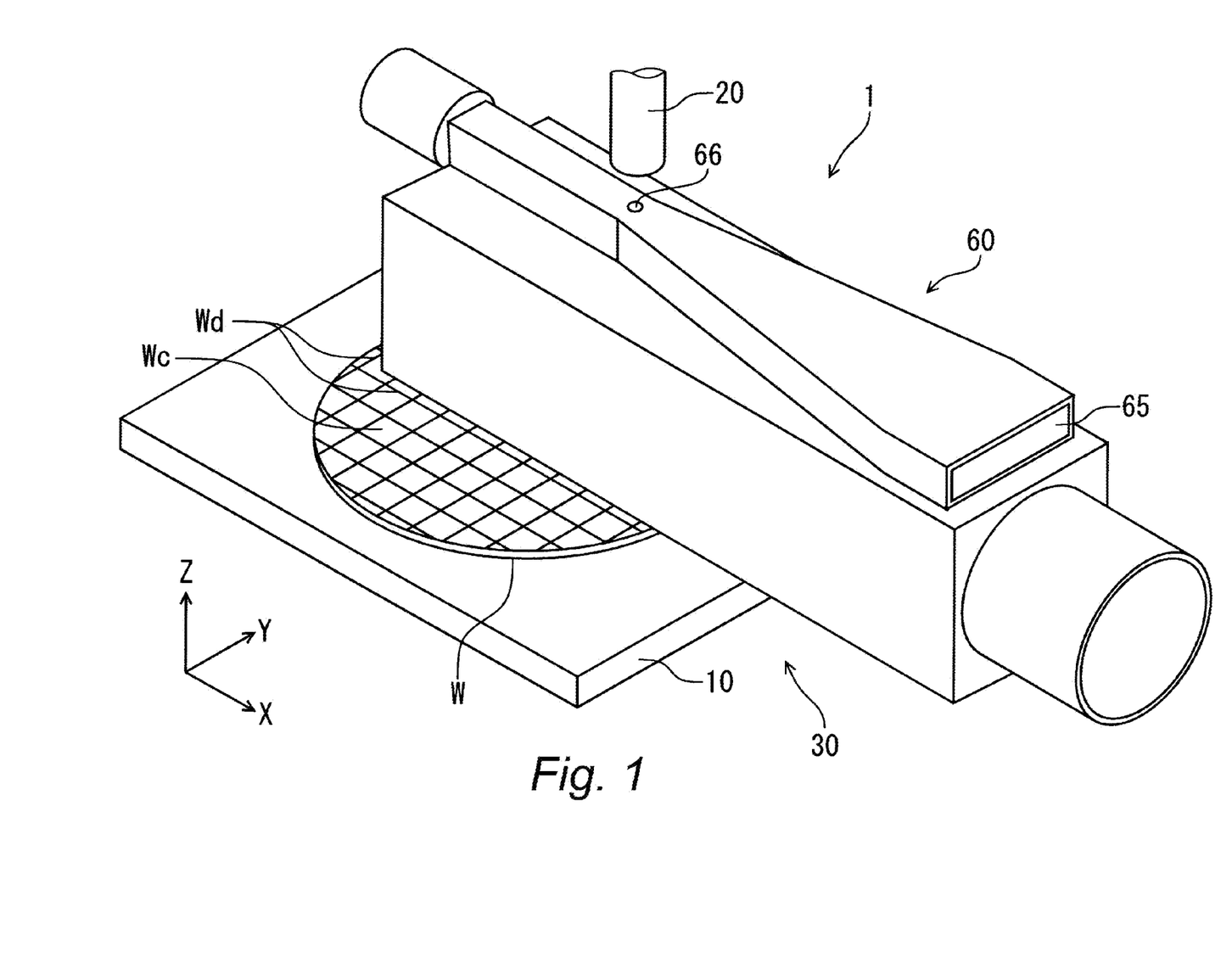
FIG. 1 is a perspective view of a laser processing apparatus according to an embodiment of the present invention, illustrating major components thereof.

FIG. 1 is a perspective view of a laser processing apparatus 1 according to an embodiment of the present invention. The laser processing apparatus 1 of the present embodiment includes a supporting base, a driving mechanism secured on the supporting base (both not shown), a stage 10 capable of moving in X- and Y-directions in FIG. 1, by means of the driving mechanism, and a laser beam source 20 radiating a laser beam onto a processed substrate W (which is also referred to simply as "substrate W" or "work W") to process the substrate W held on the stage 10. The laser processing apparatus 1 of the present embodiment further includes a dust-suction duct 32 and a dust-suction mechanism 30 having a dust-suction pump (not shown) for sucking a laser-excited plasma cloud and debris formed by radiating the laser beam onto the substrate W. Also, the laser processing apparatus 1 may include a dust-prevention mechanism 60 for preventing the debris from being adhered on the laser beam source 20.

[Driving Mechanism] Although not shown in detail, the driving mechanism may have any configurations, as long as it is secured on a stationary supporting base and it supports the stage 10 while allowing it to move in X- and Y-directions. For example, the driving mechanism may include an X-axis driver for driving the stage 10 in the X-direction and the direction opposite thereto (which may be referred to as the counter X-direction) and a Y-axis driver for driving the stage 10 in the Y-direction and the direction opposite thereto (which may be referred to as the counter Y-direction).

[Table] Also, the table 10 may be structured in any ways, as long as it can move in the X- and Y-directions by means of the driving mechanism. The table 10 is configured to hold the processed substrate W such as a semiconductor substrate. In the present disclosure, an annular frame adhered on a protecting tape may be referred to as a conveying carrier. While FIG. 1 illustrates the stage 10 directly holding the substrate W (for example, by an electrostatic attraction), the stage 10 may indirectly hold the substrate W by electrostatically attracting the conveying carrier also having the substrate W adhered on the protecting tape.

[Processed Substrate] The processed substrate W includes a plurality of element regions Wc and lattice-shaped dicing regions Wd (streets) defining each of the element regions Wc. The substrate W is aligned to the stage 10 so that the dicing regions Wd are aligned along the X- and Y-directions. Any desired electrical circuits may be formed in each of the element regions Wc, and a plurality of semiconductor chips containing the desired electrical circuit can be produced by dicing the substrate W along the dicing regions Wd. The substrate W may be made of semiconductor material such as silicon (Si), gallium arsenide (GaAs), gallium nitride (GaN), and silicon carbide (SiC).

[Laser Beam Source] The laser beam source 20 is secured on the supporting base (not shown). The laser beam source 20 is configured to process the substrate W by radiating the laser beam onto the substrate W which is held on the stage 10, and especially to achieve a grooving process with a laser ablasion by radiating the laser beam onto the dicing regions Wd of the substrate W. Any type of the laser beam source 20 may be adapted, and for example, it may be a YAG laser beam source.

Figure 2:
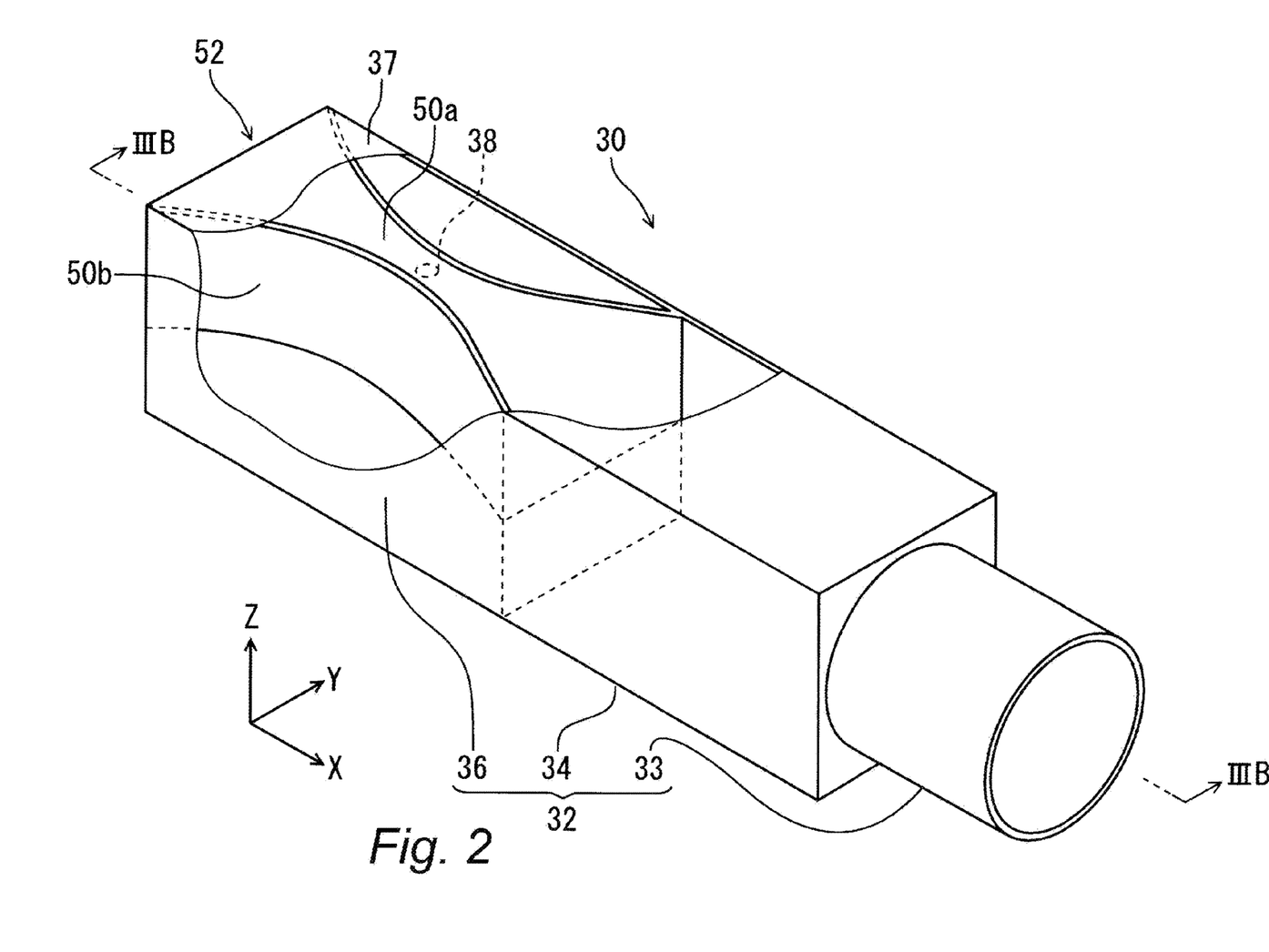
FIG. 2 is a partially-exploded perspective view of a dust-suction duct of a dust-suction mechanism of the laser processing apparatus shown in FIG. 1.
Figure 3A:
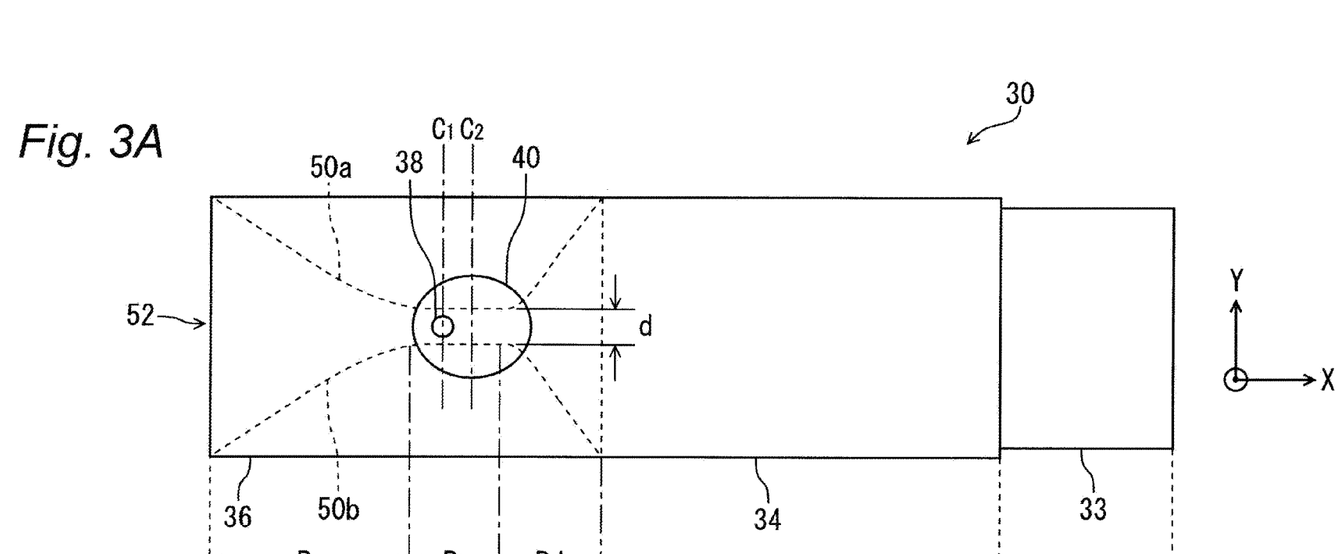
FIG. 3A is a bottom plan view of the dust-suction duct of FIG. 2.
Figure 3B:
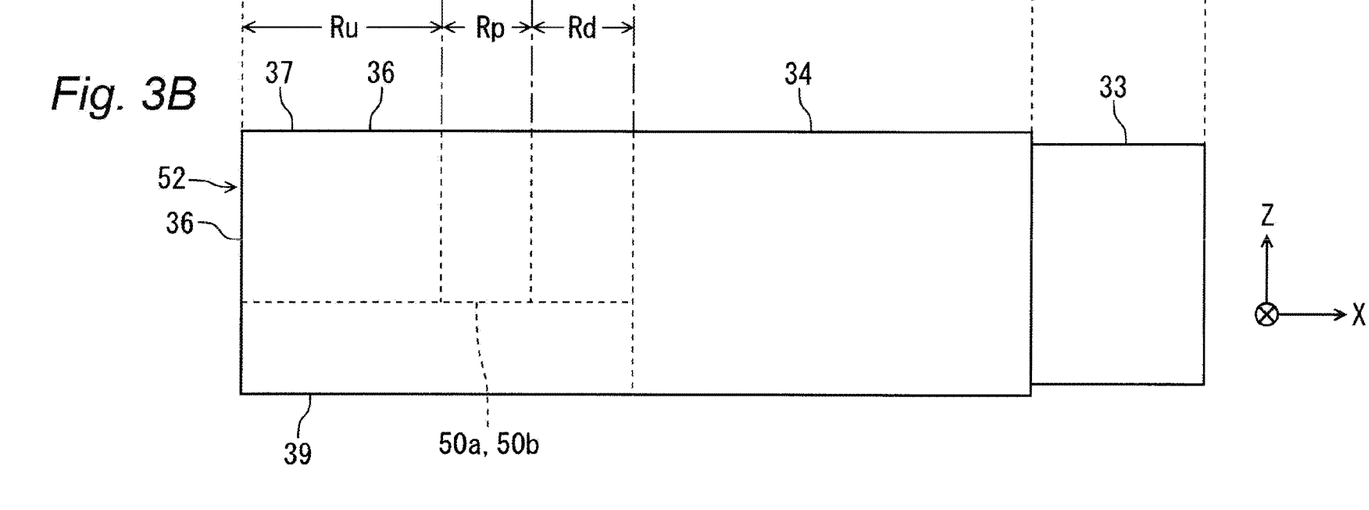
FIG. 3B is a cross-sectional view of the dust-suction duct taken along IIIB-IIIB of FIG. 2.

[Dust-suction Mechanism] The dust-suction mechanism 30 includes the dust-suction duct 32 provided between the laser beam source 20 and the substrate W held on the stage 10, and the dust-suction pump formed as a Venturi pump (not shown). In the present disclosure, the dust-suction pump may also be referred to as an air aspirator. FIG. 2 is a partially-exploded perspective view of the dust-suction duct 32 of the dust-suction mechanism 30, with eliminating the stage 10, the substrate W, the laser beam source 20, and the dust-prevention mechanism 60 (as will be described hereinafter) from the laser processing apparatus 1 shown in FIG. 1. FIG. 3A is a bottom view of the dust-suction duct 32 viewing from the bottom (towards the Z-direction), FIG. 3B is a cross-sectional view of the dust-suction duct 32, which is taken along a line of IIIB-IIIB of FIG. 2 (towards the Y-direction).

As illustrated in FIG. 2, the dust-suction duct 32 includes a conduit 33 connected to the dust-suction pump through a flexible hose (both not shown), a first housing 34 connected to the conduit 33, and a second housing 36 connected to the first housing 34. The first housing 34 and the second housing 36 are configured in a tubular shape such that the air sucked by the dust-suction pump is guided to flow in the X-direction. Although FIG. 2 illustrates the dust-suction duct 32 having a rectangular cross section, it is not limited thereto, the dust-suction duct 32 may have a circular cross section.

It should be noted that since the dust-suction mechanism 30 is configured to suck the air with debris into the dust-suction duct 32 and to exhaust the air outside the processing chamber (not shown) which encompasses the laser processing apparatus 1, the flexible hose connected to the conduit 33 is arranged to extend outside the processing chamber. Thus, the dust-suction pump (the Venturi pump) of the dust-suction mechanism 30 is connected to the flexible hose outside the processing chamber.

The second housing 36 includes a first opening 38 in a top plate 37, and a second opening 40 in a bottom plate 39. The laser beam emitted from the laser beam source 20 travels along an optical path (conveniently referred to as a first optical path) between the first opening 38 and the second opening 40, which is then irradiated onto the substrate W held on the stage 10. The first opening 38 is denoted by a dotted oval in FIG. 2, and by a solid circle having a center $C_1$ in FIG. 3A. On the other hand, the second opening 40 is denoted by a solid oval having a center $C_2$ in FIG. 3A. As will be described in detail hereinafter, the center $C_2$ of the second opening 40 is offset in the X-direction relative to the center $C_1$ of the first opening 38. The air containing the debris is sucked from the second opening 40 into the duct-suction duct 32.

In general, the laser beam has an optical intensity with a Gaussian distribution. The first opening 38 preferably has a diameter equal to or more than a beam width of the laser beam in which the optical intensity is $1/e^2$ (about 86%) of the peak intensity thereof. Also, the first opening 38 preferably has a diameter equal to or more than 1.2 times of the beam width, in order for the whole laser beam to passing through the first opening 38.

The second housing 36 includes a pair of air-guiding plates (baffles) 50a, 50b opposing each other in the Y-direction. Also, the second housing 36 has an open end 52 upstream in the X-direction along which the sucked air flows. The air-guiding plates 50a, 50b are connected to the first housing 34 downstream and the open end upstream in the X-direction, as illustrated in FIGS. 3A and 3B. Also, each of the air-guiding plates 50a, 50b is configured to be curved in a streamline so that the gap width therebetween is narrowest in an optical-path region Rp containing the optical path of the laser beam and is wider in an upstream region Ru and a downstream region Rd as further away from the optical-path region Rp. In other words, the air-guiding plates 50a, 50b are formed to have the gap width gradually (or continuously) expanding in the upstream region Ru and the downstream region Rd as further away from the optical-path region Rp so that the air sucked by the duct-suction pump from the open end 52 through the second housing 36 forms a laminar flow.

As discussed above, the pair of the air-guiding plates 50a, 50b minimizes the cross-sectional area in the optical-path region Rp taken along a Y-Z plane so that the air flow rate sucked by the dust-suction pump can significantly be increased in the optical-path region between the air-guiding plates 50a, 50b. In the present disclosure, the aforementioned laminar flow is used for one which forms no turbulent flow in the upstream region Ru and the downstream region Rd and unlikely disturbs an increase of the flow rate. For example, each of the air-guiding plates 50a, 50b has a length along the optical path (in the Z-direction) that is 37 mm or more, and the gap width d therebetween in the optical-path region Rp is arranged so as to have 1.2 times or more and 3 time or less than the beam diameter. Also, the air-guiding plates 50a, 50b may be designed to increase the air flow rate (for example, about 32 m/s) aspirated by the dust-suction pump having a nominal discharge flow rate of 7000 NL/min., to about 3.4 times (for example, about 110 m/s) or more than that of the aspirated air flow. Furthermore, the air-guiding plates 50a, 50b may be configured to have the length in the Z-direction of 50 mm or more.

Although needless to mention, the dust-suction device of the aforementioned Patent Document 1 is formed in a reverse U-shaped member, including a rectangular ceiling wall, and a pair of side walls extending down from the ceiling wall, thus having a constant cross section, which cannot increase the discharge flow rate in the dust-suction device.

Figure 4A:
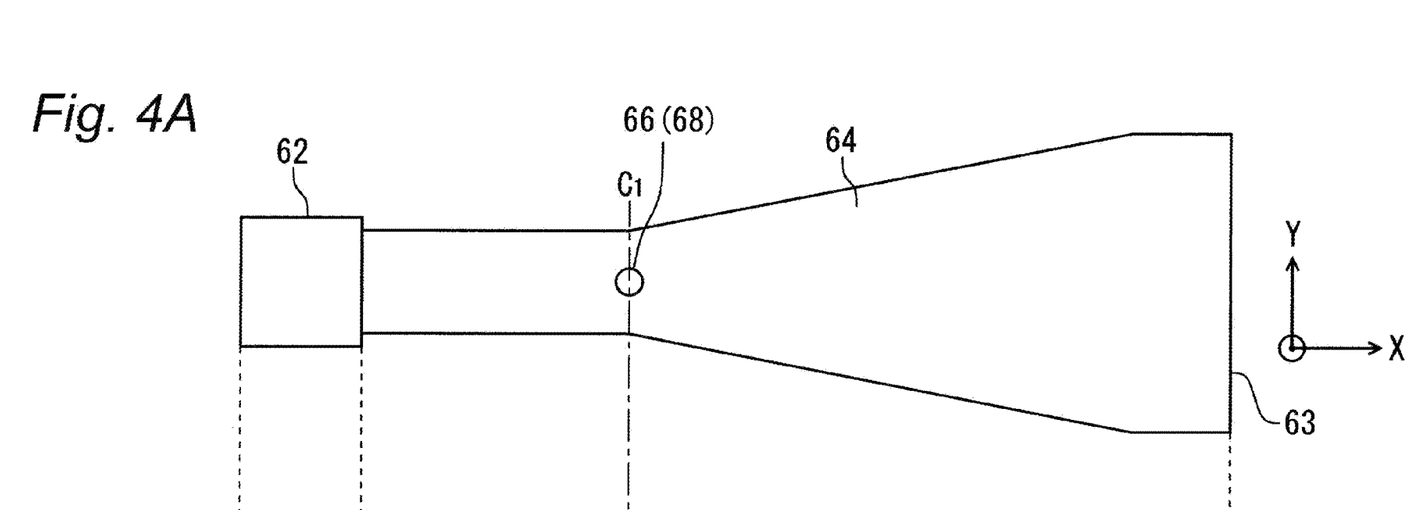
FIG. 4A is a top plan view of a dust-prevention duct.
Figure 4B:
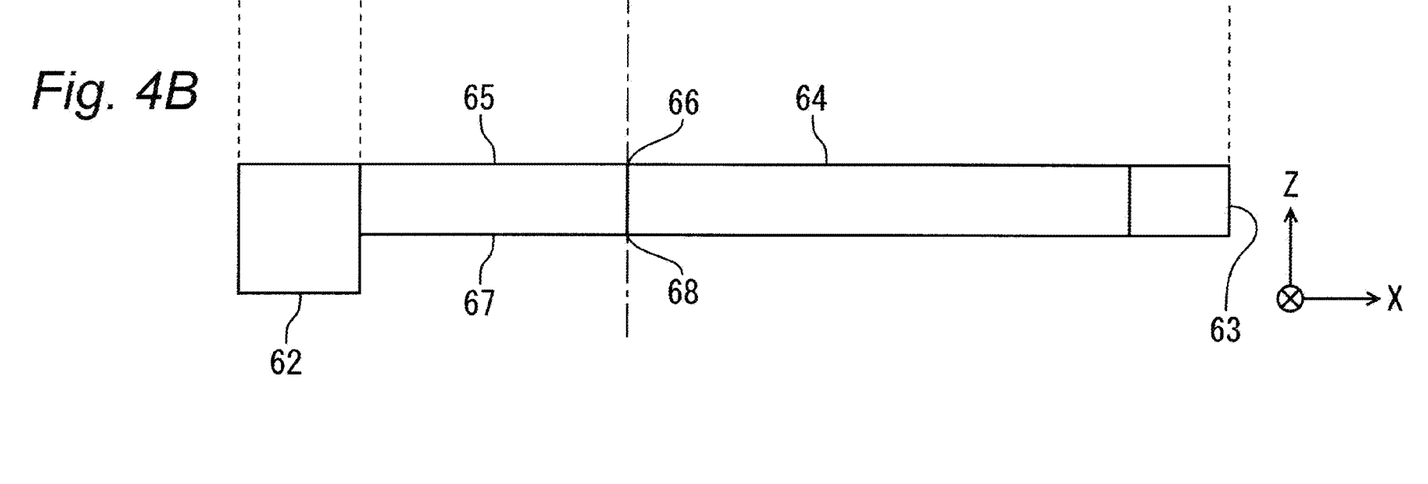
FIG. 4B is a side view of the dust-prevention duct.

[Dust-prevention Mechanism] As illustrated in FIG. 1, the dust-prevention mechanism 60 includes a dust-prevention duct 64 provided between the laser beam source 20 and the dust-suction duct 64, and an air blower 62 upstream the dust-prevention duct 64. FIG. 4A is a top plan view of the dust-prevention mechanism 60 from the top (the direction opposite to the Z-direction), and FIG. 4B is a side view of the dust-prevention mechanism 60 from the side (the Y-direction)

The air blower 62 is adapted to blast the air within the dust-prevention duct 64 in the X-direction, and the dust-prevention duct 64 is formed in a tubular shape to guide the air blasted from the air blower 62 through a downstream open end 63. Also, the dust-prevention duct 64 includes a third opening in an upper wall 65 and a fourth opening 68 in a lower wall 67. The laser beam emitted from the laser beam source 20 travels along an optical path (conveniently referred to as a second optical path) between the third opening 66 and the fourth opening 68 and then travels along the first optical path as described above. It should be noted that FIG. 4A shows the third opening 66 overlapping the fourth opening 68. Thus, the duct-suction duct 32 and the dust-prevention duct 64 are arranged so as to align the first optical path and the second optical path to each other. Therefore, the laser beam emitted from the laser beam source 20 travels along the first optical path and the second optical path, which is then irradiated onto the substrate W held on the stage 10.

The dust-prevention duct 64 may be configured to have a cross-sectional area taken along a plane perpendicular to the X-direction (or parallel to YZ-plane), which is substantially the same upstream the second optical path (or the third and fourth openings 66, 68) and is continuously enlarging downstream the second optical path. As stated above, the dust-prevention duct 64 performs a function of an air curtain for preventing the debris from being adhered on the laser beam source 20 (especially on a collecting lens thereof). Thus, the downstream open end 63 of the dust-prevention duct 64 may be arranged within the processing chamber that encompasses the laser processing apparatus 1.

[Whole Structure of Laser Processing Apparatus] As described above, the laser processing apparatus 1 according to the embodiment of the present invention includes a) the stage 10 holding the substrate W, the stage being movable at least in the counter X-direction; b) the laser beam source 20 radiating the laser beam onto the substrate W held on the stage 10 to process the substrate W; c) the dust-suction duct 32 provided between the laser beam source 20 and the stage 10, the dust-suction duct 32 having the first optical path extending from the first opening to the second opening thereof in the counter X-direction, the laser beam travelling along the first optical path thereof; and d) the air aspirator or the suction pump provided downstream the dust-suction duct 32, the air aspirator aspirating the air within the dust-suction duct toward the X-direction. The dust-suction duct 32 includes the pair of air-guiding plates 50a, 50b opposed to each other along the Y-direction, and the pair of the air-guiding plates 50a, 50b are configured to have the gap therebetween such that it is narrowest in the optical path region containing the first optical path and gets wider as it is far away from the optical path region in upstream and downstream regions thereof.

Optionally, the laser processing apparatus 1 includes the dust-prevention mechanism 60 performing a function of the air curtain. The dust-prevention mechanism 60 provided between the laser beam source 20 and the dust-suction duct 32, including the dust-prevention duct 64 having the second optical path extending from the third opening to the fourth opening thereof in the counter Z-direction, the laser beam travelling along the second optical path thereof. Also, the dust-prevention mechanism 60 includes the air blower 62 provided upstream the dust-prevention duct 64, blowing the air into the dust-prevention duct 64 in the X-direction. The dust-prevention duct 64 is arranged so that the second optical path is aligned with the first optical path of the dust-suction duct 32.

Figure 5:
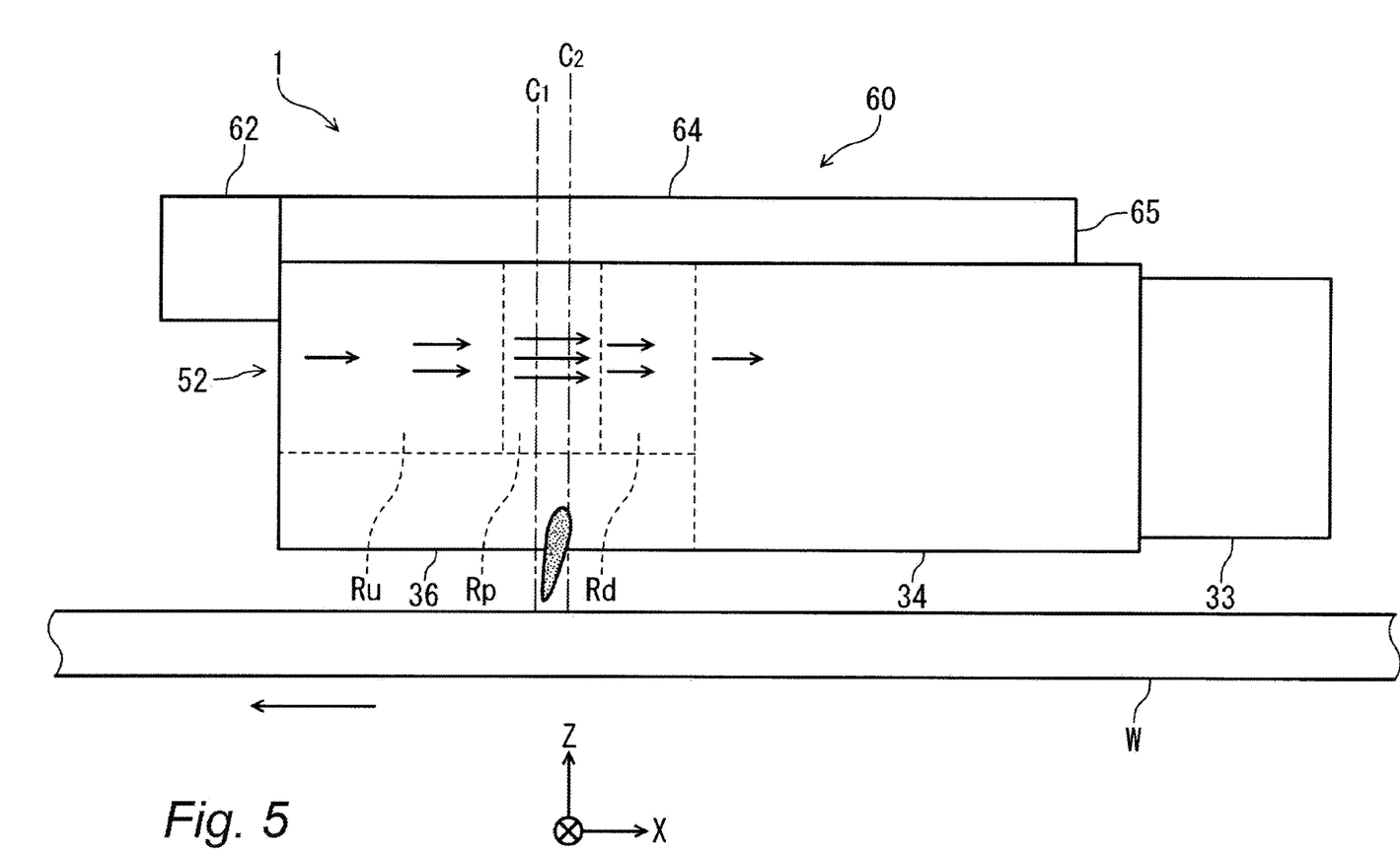
FIG. 5 is a side view of the laser processing apparatus of FIG. 1.

[Operation of Laser Processing Apparatus] Next, referring to FIGS. 5 and 6, the operation of the laser processing apparatus 1 will be described hereinafter. FIG. 5 is a side view of the laser processing apparatus 1 and the substrate W according to the embodiment of the present invention, when viewing in the Y-direction. FIG. 6 is a conceptual enlarged view of a configuration of the laser-excited plasma cloud formed by radiating the pulsed laser beam B1, B2 onto the substrate W, when using the laser processing apparatus 1 according to an embodiment of the present invention.

As described above, the driving mechanism is configured to support and drive the stage 10 to move in the X-direction and the counter X-direction and in the Y-direction and the counter Y-direction. Firstly, discussed below is the case when the driving mechanism drives the stage 10 to move in the counter X-direction (in the left direction in FIG. 5).

The stage 10 holds the substrate W by means of electrostatic attraction or vacuum attraction. The dust-suction pump constantly aspirates the air within the dust-suction duct 32 in the X-direction. In the second housing 36 of the dust-suction duct 32, the pair of the air-guiding plates 50*a*, 50*b* (baffles) accelerate the air sucked from the open end 52 from the upstream region Ru to the downstream region Rp. For example, the air-guiding plates 50*a*, 50*b* increases the flow rate of the air in the optical path region by 3.5 times or more (for example, about 110 m/s or more) than that of the air sucked by the dust-suction pump. The pair of the air-guiding plates 50*a*, 50*b* are shaped in a streamline causing no turbulence so as to significantly increase the flow rate of the laminar flow in the optical path region Rp.

Figure 6A:
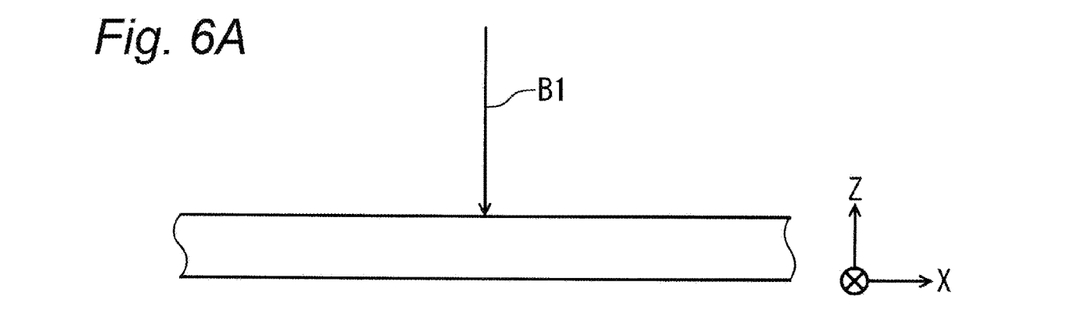
FIGS. 6A-6D are conceptual enlarged views of a configuration of a laser-excited plasma cloud formed by radiating a laser beam onto a substrate, when using the laser processing apparatus according to the embodiment of the present invention.
Figure 6B:
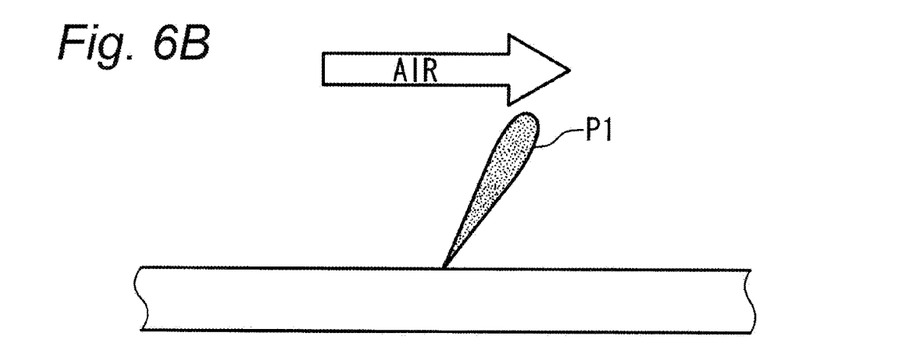
Figure 6C:
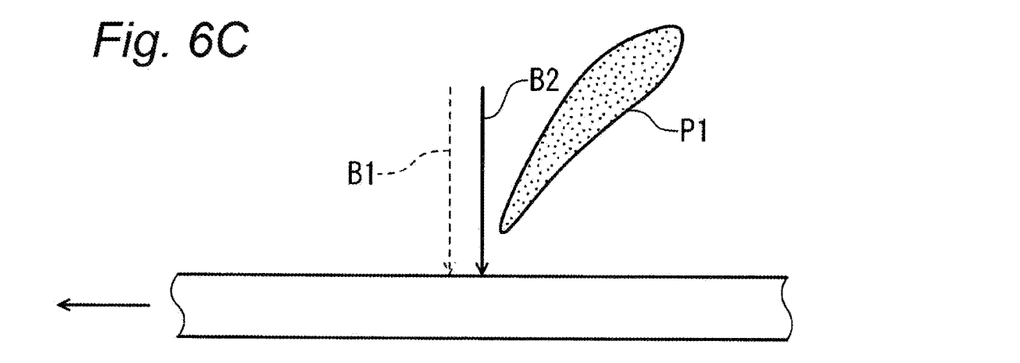

While the stage 10 holding the substrate W moves at a predetermined moving speed in the counter X-direction, the laser beam source 20 radiates the first pulsed laser beam B1 travelling along the second optical path of the dust-prevention duct 64 and the first optical path of the dust-suction duct 32 (that is, through the center $C_1$ of third and fourth openings 66, 68 and the first opening 38) onto the dicing regions Wd of the substrate W (FIG. 6A). This laser beam fuses the constituent of the substrate W such as silicon and makes the fused debris splattering and recoiling. Also, when the fused debris receives the high-energy laser beam, the silicon atoms disassociate electrons therefrom to form the laser-excited plasma cloud P1 (FIG. 6B).

According to the dust-suction mechanism 30 of the embodiment, since the air-guiding plates 50*a*, 50*b* are configured to have the gap therebetween being narrowest in the optical-path region Rp containing the first optical path of the laser beam and being wider in the upstream region Ru and the downstream region Rd as further away from the optical-path region Rp, the air flow rate of the laminar flow in the X-direction can significantly be increased in the optical-path region Rp containing the center $C_1$. This results in the laser-excited plasma cloud P1 being aspirated by the laminar flow having extremely enhanced flow rate and substantially inclined (or trailed) in the X-direction Next, the stage 10 holding the substrate W moves at a given small distance in the counter X-direction, the laser beam source 20 radiates the second pulsed laser B2 onto the dicing regions Wd of the substrate W. At this moment, the laser-excited plasma cloud P1 formed by the first pulsed laser beam B1 is further aspirated by the laminar flow in the X-direction and more inclined, deviating away from the optical path of the second pulsed laser beam B2. Therefore, the laser processing apparatus 1 according to the present embodiment allows the second pulsed laser beam B2 irradiated on the predetermined precise position in the dicing regions Wd of the substrate W without being refracted by the laser-excited plasma cloud P1 formed by the first pulsed laser beam, thereby preventing the processed lines made by the subsequent laser beam from meandering.

As described above, since the center $C_2$ of the second opening 40 is offset in the X-direction relative to the center $C_1$ of the first opening 38 (see FIG. 3A), the dust-suction duct 32 of the second housing 36 can retrieve the laser-excited plasma cloud P1 (also the debris contained therein) which is inclined in the X-direction in an efficient manner (see FIG. 5).

Figure 6D:
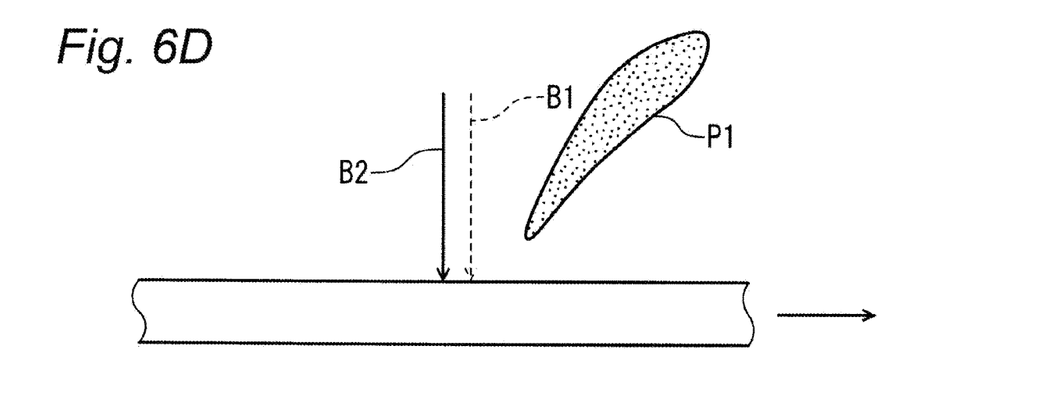

Another case will be described hereinafter when the driving mechanism drives the stage 10 to move in the X-direction (in the right direction in FIG. 5). When the laser beam source 20 radiates the first pulsed laser beam B1 into the dicing region Wd of the substrate W and the stage 10 holding the substrate W moves at a predetermined moving speed in the X-direction, the laser-excited plasma cloud P1 formed by the first pulsed laser beam B1 is moved away from the optical path of the second pulsed laser beam B2 along with the movement of the stage 10 in the X-direction. Furthermore, the laser-excited plasma cloud P1 is also aspirated by the laminar flow in the X-direction and more inclined, deviating much far away from the optical path of the second pulsed laser beam B2 (FIG. 6D). Therefore, the laser processing apparatus 1 according to the present embodiment allows the subsequent pulsed laser beam irradiated on the predetermined precise position in the dicing regions Wd of the substrate W without being refracted by the laser-excited plasma cloud formed by the previous pulsed laser beam, thereby preventing the processed lines made by the subsequent laser beam from meandering.

In the above description, the driving mechanism drives the stage 10 in the left or right direction in FIG. 5 (the reverse X-direction or the X-direction), however the present invention can achieve the same advantage when the driving mechanism drives the stage 10 in the reverse Y-direction or the Y-direction. Although not illustrated in detail, when the laser beam source 20 radiates the first pulsed laser beam B1 into the dicing region Wd of the substrate W and the stage 10 holding the substrate W moves at a predetermined moving speed in the reverse Y-direction, the laser-excited plasma cloud P1 formed by the first pulsed laser beam B1 is moved away from the optical path of the second pulsed laser beam B2 along with the movement of the stage 10 in the Y-direction. Furthermore, the laser-excited plasma cloud P1 is also aspirated by the laminar flow in the X-direction and more inclined, deviating much far away from the optical path of the second pulsed laser beam B2. Therefore, the laser processing apparatus 1 according to the present embodiment allows the subsequent pulsed laser beam irradiated on the predetermined precise position in the dicing regions Wd of the substrate W without being refracted by the laser-excited plasma cloud formed by the previous pulsed laser beam, thereby avoiding the processed lines made by the subsequent laser beam from meandering.

The dust-suction mechanism 30 surely aspirates the debris formed during the laser processing the substrate W and evacuates them outside the processing chamber, and therefore, removes or substantially reduces the debris adhered on the periphery of the substrate W and the processing chamber, thereby achieving a clean working space. This simplifies or eliminates a cleaning task, and solves the failure of the element chips due to contamination of the debris, thereby to improve the productivity of the element chips.

On the other hand, the dust-prevention mechanism 60 blows the air having the high flow rate within the dust-prevention duct 64 in the X-direction so as to secure air separation (the air curtain function) between the air near the laser beam source 20 and the third opening 66 which the laser beam enters, and the air within the dust-suction duct 32 of the dust-suction mechanism 30. This prevent the debris aspirated in the dust-suction duct 32 from entering the fourth opening 68 and the third opening 66 and from adhering on the collecting lens of the laser beam source 20. Thus, the laser processing apparatus 1 according to the present invention is configured to prevent the debris from adhering on the collecting lens of the laser beam source 20, thereby to secure the given functions of the laser beam source 20 and laser-process the substrate W in a more reliable manner.

[Reference Numerals] 1: laser processing apparatus, 10: stage, 20: laser beam source, 30: dust-suction mechanism, 32: dust-suction duct, 33: conduit, 34: first housing, 36: second housing, 37: top plate, 38: first opening, 39: bottom plate, 40: second opening, 50a, 50b: air-guiding plate, 52: upstream open end, 60: dust-prevention mechanism, 62: air blower, 63: downstream open end, 64: dust-prevention duct, 65: upper wall 66: third opening, 67: lower wall, 68: fourth opening, W: substrate, Wc: element regions, Wd: dicing regions, Rp: optical-path region, Ru: upstream region, Rd: downstream region, B1, B2: pulsed laser beam, P1, P2: laser-excited plasma cloud

What is claimed is:

1. A laser processing apparatus, comprising:
   a stage holding a substrate, the stage being movable at least in a first direction;
   a laser beam source radiating a laser beam onto the substrate held on the stage to process the substrate;
   a dust-suction duct provided between the laser beam source and the stage, the dust-suction duct having a first optical path extending from a first opening to a second opening thereof in a second direction perpendicular to the first direction, the laser beam travelling along the first optical path thereof; and
   an air aspirator provided downstream the dust-suction duct, the air aspirator aspirating an air within the dust-suction duct toward a direction opposite to the first direction,
   wherein the dust-suction duct includes a pair of air-guiding plates opposed to each other along a third direction perpendicular to the first and second directions, and
   wherein the pair of the air-guiding plates are opposed to each other across the first optical path and configured to have a gap therebetween such that it is narrowest in an optical path region containing the first optical path and gets wider as it is far away from the optical path region in upstream and downstream regions thereof.

2. The laser processing apparatus according to claim 1, wherein the pair of air-guiding plates are configured to have the gap therebetween such that it gradually gets wider as it is far away from the optical path region in the upstream and downstream regions thereof, thereby generating a laminar flow of the air sucked by the air aspirator.

3. The laser processing apparatus according to claim 1, wherein the first optical path has a length of 37 mm or more, and the gap of the pair of air-guiding plates in the optical path region is 1.2 times or more and 3 times or less than a beam diameter of the laser beam.

4. The laser processing apparatus according to claim 1, wherein the first opening has a planar outline which is substantially circular, the second opening has a planar outline which is substantially circular or substantially oval, and the first opening has a first center offset in the first direction relative to a second center of the second opening.

5. The laser processing apparatus according to claim 1, further comprising:
   a dust-prevention duct provided between the laser beam source and the dust-suction duct, the dust-prevention duct having a second optical path extending from a third opening to a fourth opening thereof in the second direction perpendicular to the first direction, the laser beam travelling along the second optical path thereof; and
   an air blower provided upstream the dust-prevention duct, blowing the air into the dust-prevention duct in the first direction,
   wherein the dust-prevention duct is arranged so that the second optical path is aligned with the first optical path of the dust-suction duct.

6. The laser processing apparatus according to claim 5, wherein the dust-prevention duct has a cross section perpendicular to the first direction of which area is substantially the same in a region upstream the second optical path and continuously increasing in a region downstream the second optical path.

7. The laser processing apparatus according to claim 1, wherein the stage is movable in a direction opposite to the first direction, in the second direction, and in a direction opposite to the second direction.

8. The laser processing apparatus according to claim 1, wherein a flow rate of the air passing through the optical path region of the dust-suction duct is 110 m/s or more.

* * * * *